Sept. 10, 1940.　　　J. R. RANKIN　　　2,213,994
FUEL FEEDING DEVICE
Filed March 1, 1939
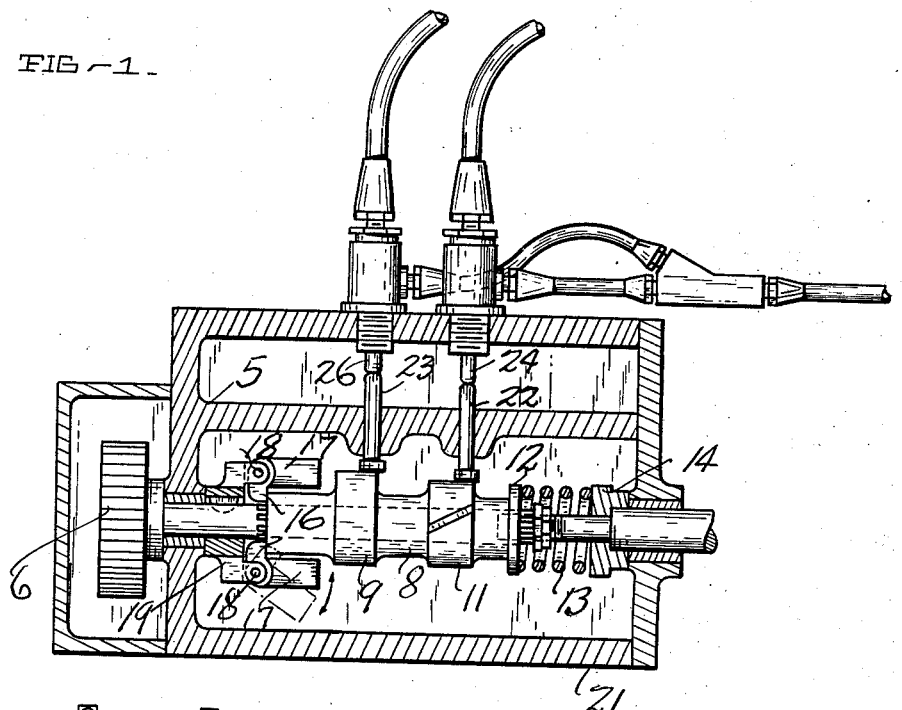
FIG-1-
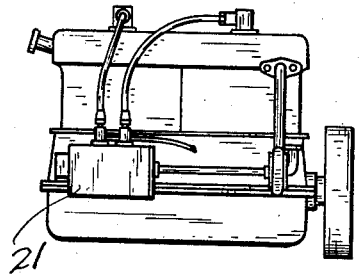
FIG-2-
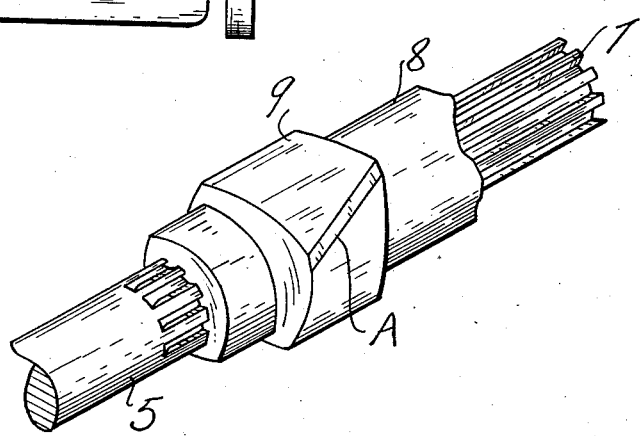
FIG-3-
INVENTOR.
JOHN R. RANKIN
BY
ATTORNEYS.

Patented Sept. 10, 1940

2,213,994

UNITED STATES PATENT OFFICE 2,213,994

FUEL FEEDING DEVICE

John R. Rankin, Woodland, Calif.

Application March 1, 1939, Serial No. 259,246

3 Claims. (Cl. 74—568)

This invention relates to improvements in fuel feeding devices for Diesel type engines.

The principal object of this invention is to provide means for varying the time of fuel injection to the cylinders of the engine with relation to the fly wheel degree position at the piston head.

A further object of the invention is to produce a device of this character which may be applied to the ordinary Diesel type engine without materially altering its construction.

A further object is to produce a device of this character which is simple in construction, automatic in operation, and one which will give long service.

Other objects and advantages will be apparent during the course of the following description.

In the accompanying drawing forming a part of this specification and in which like numerals are employed to designate like parts throughout the same, Fig. 1 is a side elevation of my device as the same would be applied to a fuel injector system;

Fig. 2 is a side elevation of an engine having my device applied thereto; and

Fig. 3 is a perspective view of the sliding cam.

The ordinary Diesel engine depends upon a series of fuel injections at a predetermined period of time, which fuel injections are ignited to give power to the engine. These fuel injections may be varied so as to give a definite quantity of fuel under fixed pressure. This fuel enters the cylinder at a fixed time with relation to the fly wheel position, which, of course, determines the position of the cylinder head. Consequently, as the fuel enters the cylinder at a definite fixed time, this condition permits preignition at idling speeds with its attendant preignition knock. Therefore, in all Diesel engines there is slow engine acceleration, low engine efficiency, and other disadvantages.

I have, therefore, provided a simple arrangement whereby I may readily vary the time of the introduction of the fuel into the engine.

I accomplish this by providing a driven shaft 5, driven through a gear 6 from any moving part of the engine. This shaft 5 is provided with longitudinal splines 7 so as to slidably position a cam sleeve 8 upon which are formed cams 9 and 11.

This sleeve 8 bears against a thrust bearing 12, which in turn bears against one end of a spring 13, the opposite end of which spring contacts a bearing nut 14. The opposite end of the sleeve is contacted by the noses 16 of centrifugal governor weights 17, which are pivoted as at 18 to a carrier 19 keyed to the shaft 5. This whole assembly is housed in a casing 21, and pusher pins 22 and 23 overlie the cams 9 and 11. These pusher pins 22 and 23 in turn contact the fuel pump pins 24 and 26 respectively. By viewing Fig. 3 it will be noted that the surface of the cam 9 is formed with its high part diagonally disposed, as shown at A, with relation to the axis of the shaft 5. It is, of course, understood that the cam 11 is constructed in the same manner.

As a result of this construction, when the sleeve 8 is moved endwise, the time at which the portion A of the cam reaches the pusher pin will vary, depending upon which portion of the cam underlies the pusher pin.

By viewing Fig. 1 it will be noted that under low speeds the governor weights 17 will not have sufficient strength to overcome the action of the spring 13. Consequently, the pusher pins 22 and 23 will ride upon the right-hand edge of their respective cams. As the speed of the engine is increased, the governor weights will tend to move outwardly, as shown in dotted lines, and the noses thereof will force the sleeve toward the right of the drawing against the tension of the spring 13, thus moving the cams toward the right. As a result, the pusher pins will now contact the cams at some point to the left of their present position. Therefore, the surface A will raise the pusher pins at a different time with relation to the position of the pistons in the cylinders. Consequently, the injection of fuel will be advanced or retarded, as the case may be. This is accomplished automatically with the speed of the engine.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In a device of the character described for use with an internal combustion engine, a driven shaft, a sleeve slidable on said driven shaft, governor arms pivotally mounted on the driven shaft and having their inner ends engaging the sleeve for moving the same on the shaft, cams formed on said sleeve, said cams having peak portions diagonally disposed with relation to the axis of the sleeve, whereby longitudinal movement of said sleeve will effect a timing arrangement when contacting the pusher pins of a fuel system of the engine.

2. In a device of the character described, for use with an internal combustion engine, having a fuel pump, push pins operating said pump, a shaft timed and driven with an engine, a sleeve splined on said shaft, a spring engaging one end of the sleeve and forcing it toward the opposite end of the shaft, a collar keyed on said shaft at the opposite end of the sleeve, governor arms pivoted to said collar and having laterally turned ends beyond the pivots engaging the end of the sleeve, a cam on said sleeve and having a peak portion diagonally disposed with relation to the axis of the sleeve, and said cam engaged by the push pins.

3. In a device of the character described, for use with an internal combustion engine having a fuel pump, a housing, push pins extending into the housing and operating said pump, a time shaft driven by an engine extending through said housing at right angles to the push pins, a sleeve splined on said shaft, a collar carried by the shaft on one side of the sleeve, a spring surrounding the shaft and having one end engaging the collar and the opposite end the sleeve for normally forcing at right angles to the push pins, a sleeve collar keyed on said shaft beyond the opposite end of the sleeve, L-shaped governor arms pivoted to said collar and having their short ends engaging the end of the sleeve, a cam on said shaft and adapted to engage the push pins.

JOHN R. RANKIN.